Figures 1, 2:
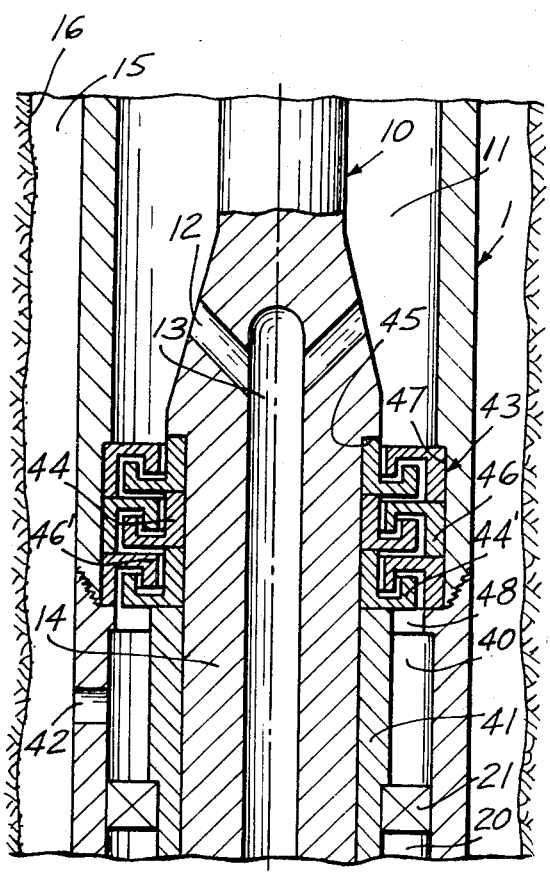

United States Patent

Dicky

[15] 3,659,662

[45] May 2, 1972

[54] THRUST BEARINGS FOR UNDERGROUND DRILLING ENGINES

[72] Inventor: Leonide Dicky, Grenoble, France

[73] Assignee: Societe Generale de Constructions Electriques et Mecaniques (ALSTHOM), Grenoble, France

[22] Filed: Apr. 22, 1970

[21] Appl. No.: 30,803

[30] Foreign Application Priority Data

Apr. 25, 1969 France..................................6911838

[52] U.S. Cl..............................................175/107, 277/3
[51] Int. Cl...................................................E21b 3/12
[58] Field of Search..................175/107, 104, 101, 320; 184/39, 41; 277/3, 73, 57; 415/57, 502

[56] References Cited

UNITED STATES PATENTS

| | | | |
|---|---|---|---|
| 3,544,116 | 12/1970 | Peterson | 277/3 |
| 3,356,338 | 12/1967 | Ioanesyan et al. | 175/107 X |
| 3,149,685 | 9/1964 | Mitchell et al. | 175/107 |
| 3,365,202 | 1/1968 | Carleton | 175/107 X |

FOREIGN PATENTS OR APPLICATIONS

| | | | |
|---|---|---|---|
| 1,195,283 | 5/1959 | France | 175/107 |
| 1,923,282 | 5/1969 | Germany | 175/107 |

*Primary Examiner*—David H. Brown
*Attorney*—Sylvester J. Liddy, John J. Hart, Joe E. Daniels and Charles E. Baxley

[57] ABSTRACT

The oil bath layout for the lower thrust bearing in an underground drilling machine comprises an upper sealing joint below which means are provided for maintaining the oil pressure at a level which is at least equal to that of the surrounding pressure of the mud in the borehole. Such means may include a cylinder fitted with a piston and having one of its chambers in communication with the oil bath and the other of its chambers in communication with the borehole. An oil pressure control spring is located in the chamber in communication with the borehole and acts on the piston. The upper sealing joint forms the lower end of a second chamber in communication with the borehole and closed at its upper end by a leak limiting joint, such as one of the labyrinth type.

5 Claims, 2 Drawing Figures

PATENTED MAY 2 1972 3,659,662

INVENTOR.
LÉONIDE DICKY
BY
ATTORNEY 3,659,662

THRUST BEARINGS FOR UNDERGROUND DRILLING ENGINES

THE INVENTION

This invention relates to underground drilling engines, such as electric drilling machines, volumetric hydraulic engines, turbo-drills and the like, and more particularly to an improved thrust bearing for such type of drilling engines.

Drilling machines of the indicated type may be fitted with radial or axial bearings housed in lubricating oil baths. In such constructions, the oil housing must be isolated by suitable sealing means from the surrounding areas which are filled with drilling mud. A current method of so sealing the oil housing for a lower thrust bearing running in an oil bath, is to locate between the upper and lower sealing joints of the housing, a device for maintaining the oil in the housing at a pressure which is never lower than that in the borehole of the well. This device is composed of a cylinder fitted with a piston and having one of its cylinder chambers connected with the oil-filled area of the housing while the other chamber thereof is in communication with the borehole. An oil pressure setting spring is mounted in the chamber which is in communication with the borehole and this spring acts on the piston. It has been found that this lay-out has the drawback that in operation it causes the two sealing joints of the oil housing to be subjected to great differences in pressure. Thus, the upper sealing joint of the housing is subjected to the high pressure of the drilling mud before it passes through the unit, while the lower sealing joint thereof is subjected to a far lower pressure, that of the borehole at the outlet of the drilling tool. Under such conditions, dependent on whether the oil pressure in the thrust bearing is set at a level above or below that of the pressure of the drilling mud acting on the upper sealing joint, there may occur, due to the aforesaid great differences in the pressures applied to the sealing joints; either an oil leak from the bearing through the lower sealing joint, or a penetration of the drilling mud into the bearing through the upper sealing joint.

It is the primary purpose of the present invention to improve this type of device so to avoid the above discussed drawback. Essentially this is accomplished in accordance with the invention by providing a chamber in communication with the borehole of the well above the upper sealing joint and isolating such chamber in its upper area from the high pressure drilling mud passing through the unit by a leak limit joint (for example) of the labyrinth type. As a result of such construction, both sealing joints are subjected to the pressure of the borehole and any penetration of drilling mud into the thrust bearings can be prevented by slightly overpressurizing the oil in the thrust bearing, without risking oil leaks.

In order that a better understanding of the invention may be obtained, reference is made to the following description of a conventional lay-out construction fitted to a turbo-drilling machine as an example of the manner in which the invention may be practiced and to the accompanying drawings in which:

FIG. 1 is an axial section view of a conventional lay-out of thrust bearings such as used with a turbo-drilling machine; and FIG. 2 is an axial section view showing how the improvement of this invention may be incorporated in the lay-out illustrated in FIG. 1.

The conventional turbo-drilling machine shown in FIG. 1 of the drawings, comprises a static body indicated generally by the reference numeral 1, and enclosing a rotating drill shaft generally designated 10 and driven by the turbine blades, not shown, as is usual. The turbine, as is customary, is driven by drilling mud which enters into an annular space 11 between the body 1 and the shaft 10 after passing through the outlet of the turbine blades. The drilling mud passes through openings 12 bored in the shaft 10 into a barrelling 13 formed in the lower portion 14 of shaft 10 and then flows downwardly through such barrelling. From there, the mud penetrates the drilling tool, not shown, which is screwed to the lower end of the shaft portion 14, and passes from such tool into the well to flow upwardly through the annular space 15 formed by the bore between the well wall 16 and the body 1 of the turbine drilling machine.

The body 1 of the drilling turbine includes two lower parts 2 and 3 which are assembled in threaded relation as indicated. Formed in the space between such body parts 2, 3 and the portion 14 of the shaft 10 is an oil bath 20 which is isolated from the mud by an upper sealing unit 21 and a lower sealing unit 22, both of usual construction. In the oil bath 20 housed by the body parts 2, 3, the rings mounted on the shaft portion 14, and the sealing units 21, 22, are contained the radial bearings 23 for supporting the shaft 10 in the body 1 of the turbo-drilling machine, and the ball thrust bearings 24 which transmit the longitudinal dynamic stresses of the shaft 10 through to the body 1.

When the turbo-drilling machine is lowered into the bore 15, the hydrostatic pressure of the mud increases with the depth, and accordingly, there arises the risk that excessive dynamic stresses may be impressed on the oil housing sealing units 21 and 22. In an attempt to avoid this condition, there is utilized a unit of known construction designed to compensate for the hydrostatic pressure on the oil bath 20. As shown in FIG. 1 this unit comprises a cylinder 26 mounted between the body parts 2, 3 and a piston 27 slidable in such cylinder and provided with sealing joints 28. The piston 27 bears on a spring 29 seated on an external flange 30 by which the cylinder 26 is mounted on the body parts 2, 3. An opening bored in the lower body part 2 connects the area in cylinder 26 where the spring 29 is mounted with the drilling mud which fills the borehole 15. Thus, any variations in the hydrostatic pressure of the liquid in the borehole 15 are transmitted through piston 27 to the oil bath 20 between the sealing units 21, 22. The additional force of the spring 29 on the piston 27 ensures that the pressure on the oil will be greater than the mud pressure at the exterior of the turbo-drill. In the event of slight leaks of oil through the sealing unit 22, the oil would escape through the body 1, but the mud would not penetrate through the sealing unit 22 into the oil bath. Any lowering of the volume of the oil bath 20, due to such leaks will be automatically compensated for by the movement of piston 27 under the pressure of spring 29. This system however, has an important drawback resulting from the great difference in the mud pressure between the area 11 above the sealing device 21, and that of the mud in the area around the turbo-drill whose pressure acts on the sealing device 22. This unavoidably leads to the condition that the pressure in the oil bath 20 is lower than that of the mud in space 11. There is thus the choice of chancing the increased risk of mud penetrating into the oil bath through sealing device 21, or of increasing the strength of the spring 29 to make the oil pressure greater than that of the mud in area 11. In either case, however, the resultant difference in pressures on either side of the sealing device 21 is liable to be excessive and of such extent as to cause an unacceptable degree of oil leaks. This situation cannot be corrected by linking the area in cylinder 26 containing the spring 29 with area 11 instead of with the area 15 surrounding the machine, since although the spring force could be reduced, an excessive pressure would still be exerted permanently on the oil bath 20. In fact, the pressure drop of the mud through drilling tools such as diamond bits and particularly toothed wheels known as "jets" is of such extent, that the pressure difference between the oil and the drilling mud may reach several decabars and may even exceed 1 hectobar, which exceeds the tolerances of the rotating sealing joints used in current practice.

FIG. 2 of the drawings illustrates how the aforesaid drawbacks in the lay-out of FIG. 1 can be overcome by modifying such structure in accordance with the invention. In considering FIG. 2, it will be understood that the lower part of the turbine situated below the upper sealing unit 21 and not shown in such figure, is identical to that shown in FIG. 1 of the drawings and above described. The upper sealing unit 21 in the construction of FIG. 2 closes the lower end of an annular space 40 formed between the machine body 1 and a ring 41 mounted on the lower shaft portion 14. This area or space 40 is in communication with the well space 15 surrounding the machine through openings 42 bored in the body 1. A sealing unit generally designated 43 is mounted on the body 1 and the lower shaft portion 14 and separates the space 40 from the space 11 which is filled with the drilling mud under pressure discharged thereinto by the turbine blading. The sealing unit 43 is of the labyrinth type customarily used in turbo-drilling machinery and is composed of piling parts 44 mounted on the shaft portion 14 between the ring 41 and a circular shoulder 45 formed on such shaft portion adjacently below the openings 12 therethrough. The sealing unit 43 is also composed of piling parts 46 mounted in an internal groove 47 formed in the inner wall of the body 1. The parts 44, 46 are so dimensioned that the play between the parts 44 and the parts 46 is very low. The form of the sealing parts 44' and 46' which are made integral with the parts 44 and 46, respectively, is such that a complex flow line is imposed on the drilling mud and they vary considerably in section in such manner that the resistance to the flow of mud along such flow line is considerable. As a result of this construction mud leaks are limited to a technically acceptable flow level. The flow line formed by the sealing parts 44, 44', 46, and 46' is in communication with the chamber or space 40 through an annular opening 48 in the upper end of such chamber.

It will be understood from the foregoing discussion, that as a result of the construction of the turbine according to the invention, the annular space 40 above the sealing unit 21 is subjected to the pressure of the mud which fills the borehole 15, thereby subjecting both sealing units 21, 22 for the oil bath 20 to the pressure existing in the borehole 15. Thus, the inherent drawbacks in known layouts of the type shown in FIG. 1 are avoided. By choosing a suitable strength for the spring 29 so that there is ensured a slight overpressure of the oil in the thrust bearings compared with the pressure of the mud in the borehole 15, all penetration of the drilling mud in the chamber 11 into the thrust bearings may be avoided without causing oil leaks.

What is claimed is:

1. An underground drilling machine having a static body enclosing a rotating drill shaft provided with a barrelling through which fluid passes from a space containing such fluid under high pressure to the drilling tool of the machine and having between such static body and drill shaft an oil bath housing for a bearing positioned adjacent said fluid space, said housing including an end sealing joint between the oil bath therein and said fluid space, a cylinder having a piston forming the area thereof into two chambers, one of said chambers being in communication with the oil filled area in said housing, and the other of said chambers being isolated from such oil filled area and in communication with the exterior of said machine so that external fluid pressure is exerted on the oil bath in said housing and on one side of said end sealing joint, said end sealing joint forming one end of a third chamber in communication with the exterior of said machine so that external fluid pressure is exerted on the other side of said end sealing joint, and a second sealing joint between said third chamber and said fluid space, forming the other end of said third chamber, and isolating said third chamber from said fluid space.

2. An underground drilling machine as defined in claim 1, in which said second sealing joint is a leak limiting joint having a flow path in communication with both the fluid space and said third chamber.

3. An underground drilling machine as defined in claim 1, in which said second sealing joint is a leak limiting joint of the labyrinth type.

4. An underground drilling machine as defined in claim 1, including an oil pressure control spring in said other chamber and acting on said piston to provide in the oil and on said one side of said end sealing joint a slight overpressure compared with the external fluid pressure exerted on the other side of said end sealing joint.

5. An underground drilling machine as defined in claim 1, in which said housing is positioned below a fluid space containing drilling mud under high pressure, said end sealing joint thereof forms the upper sealing joint for the oil bath in said housing, said cylinder is contained in said housing and constructed so that said other chamber thereof is isolated from the oil filled area of said housing by said piston, and an oil pressure control spring contained in said other chamber and acting on said piston, so that there is provided in the oil and on said one side of said upper sealing joint a slight overpressure compared with the pressure on the other side of said upper sealing joint.

* * * * *